United States Patent [19]

Kohut et al.

[11] Patent Number: 4,795,116
[45] Date of Patent: Jan. 3, 1989

[54] FASTENER FOR CABLE STRAP

[75] Inventors: James K. Kohut, Northville; Richard A. Tabor, Sterling Heights, both of Mich.

[73] Assignee: Chrysler Motors Corporation, Highland Park, Mich.

[21] Appl. No.: 153,691

[22] Filed: Feb. 8, 1988

[51] Int. Cl.⁴ .............................................. F16L 3/08
[52] U.S. Cl. .................................. 248/73; 24/16 PB; 24/297; 248/74.3; 248/221.4; 411/508; 411/908
[58] Field of Search ............. 248/73, 74.3, 221.4; 411/502, 508, 512, 908; 403/405.1, 408.1; 24/16 PB, 297, 453, 616

[56] References Cited

U.S. PATENT DOCUMENTS

| 3,181,411 | 5/1965 | Mejlso .................................. 411/508 |
| 3,653,096 | 4/1972 | Fernberg ........................ 248/74.3 X |
| 3,778,958 | 12/1973 | Fowler .............................. 24/297 X |
| 4,470,178 | 9/1984 | Matsui .............................. 24/297 X |
| 4,490,886 | 1/1985 | Omata .............................. 24/16 PB |
| 4,669,688 | 6/1987 | Itoh et al. ........................ 24/297 X |
| 4,735,387 | 4/1988 | Hirano et al. .................. 248/74.3 X |

Primary Examiner—Ramon S. Britts
Assistant Examiner—David L. Talbott
Attorney, Agent, or Firm—Edward A. Craig

[57] ABSTRACT

A cable strap is provided for securing a cable to a panel. The cable strap comprises a flexible strap having a buckle at one end for reception of the other end of the strap to secure the cable strap to the cable. An improved fastener is provided on the outer surface of the strap for securement to a panel. The fastener includes a cup-shaped base from which extends a prong structure including rearwardly extending barbs. A flexible web is provided between each of the barbs and its respective prong to prevent splaying of the barbs after insertion through an opening in a panel.

2 Claims, 1 Drawing Sheet

U.S. Patent
Jan. 3, 1989
4,795,116
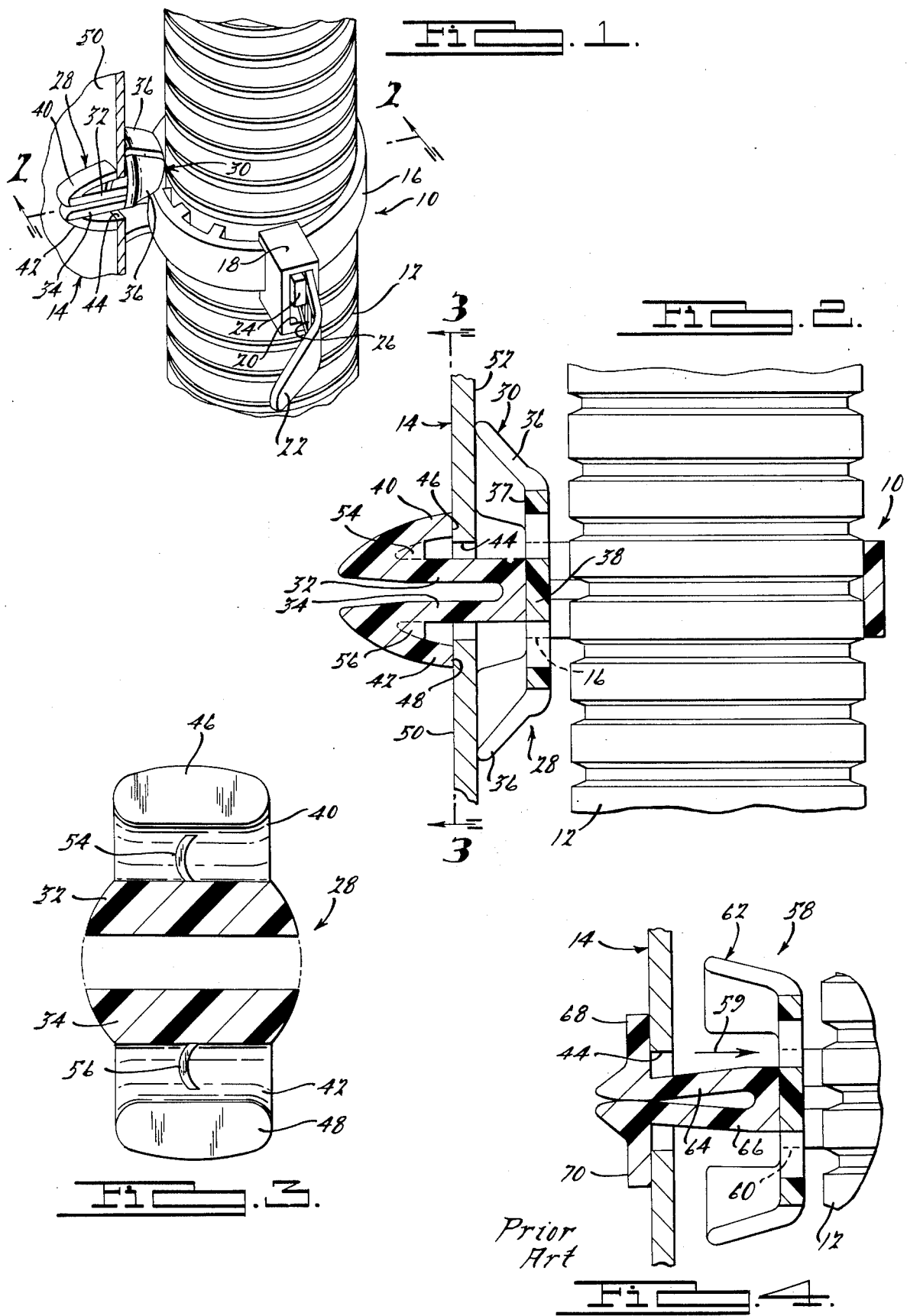

FASTENER FOR CABLE STRAP

This application is related to application Ser. No. 07/105,419, filed Oct. 7, 1987.

BACKGROUND OF THE INVENTION

1. Field of the Invention

A fastener for a cable strap is provided for securing a cable to a panel. The fastener includes web means to prevent splaying of fastener barbs.

2. Prior Art

Cable straps of the type to which the present invention pertain are in common usage particularly in the automotive industry where it is necessary to secure electrical cables in place. An example of the type of cable strap to which the present invention is related is disclosed in U.S. patent application Ser. No. 07/105,419, filed Oct. 7, 1987.

Electrical cables in connection with which the straps are used commonly form portions of wiring harnesses which are preassembled and then mounted in vehicles during assembly of the vehicles. Generally, such cable straps include a flexible strap portion having a buckle at one end. The strap portion is flexible and is wrapped around a cable or bundle of wires with one end of the strap being received in a slot in the buckle. The strap is normally provided with some type of fastening device for securement to a panel such as a sheet metal panel of a vehicle. The strap is fastened in place on the panel thereby retaining the cable in the desired location.

One fastener which is commonly used in connection with such cable straps is referred to as an "arrowhead". This type of fastener includes a cup-shaped base from which extends a pair of prongs having barbs thereon. The prong and barb structure is forced through an opening in a panel whereupon it flexes inwardly permitting passage through the opening. After the barbs have passed through the opening, they flex outwardly and press against the surface of the panel thereby preventing withdrawal of the fastener from the panel. It is desired that the cup-shaped base press against the opposite panel surface to thereby firmly secure the cable in place without the connection of the cable strap to the panel being loose.

One problem encountered in the past is that if a force is exerted against a fastener tending to pull it back through the opening, the barbs tend to splay outwardly and flatten against the panel surface thus resulting in a loose connection of the fastener with the panel. In accordance with the present invention, a web structure is provided between the barb and prong members to prevent such outward splaying of the barbs.

SUMMARY OF THE INVENTION

The fastener of the present invention is adapted for use with a cable strap for securing a cable to a panel. The cable strap comprises a flexible strap having a buckle on one end thereof. The buckle has a slot for insertion and retention of the other end of the strap with the strap wrapped around the cable. A fastener is provided on the outer surface of the strap and is insertable through an opening in the panel for securing of the strap to the panel. The fastener is located adjacent to the buckle.

The fastener includes a cup-shaped base from within which project a pair of spaced apart prongs. Each prong has a rearwardly extending barb. The fastener is fabricated of a flexible material whereby the prongs and barbs may be flexed towards each other permitting insertion through an opening in the panel of a smaller size than the unflexed size of the prong and barb structure. After insertion, there is subsequent outward flexing of the prong and barb structure to prevent removal from the panel with the outer ends of the barbs pressing against one surface of the panel and the cup-shaped base pressing against the opposite surface of the panel.

The present invention provides an improvement comprising the provision of a flexible web between each of the barbs and its prong. The webs also flex during insertion of the prong and barb structure through an opening in a panel. The webs prevent outward splaying of the barbs as a consequence of a force tending to pull the prongs back through the opening in a panel after insertion thereby, maintaining the integrity of tee position of the fastener with respect to the panel surfaces.

The webs are preferably curved to cause even folding thereof upon flexing during insertion of the prong and barb structure through the opening. Each of the webs is preferably located adjacent to the juncture of the respective prong and barb and terminates a short distance therefrom to permit unrestrained flexure of the outer portion of the barb.

DESCRIPTION OF THE DRAWING

FIG. 1 is a perspective view of one embodiment of a cable strap including the improved fastener of the present invention, on an enlarged scale with the cable strap illustratively wrapped around a cable and fastened to a panel;

FIG. 2 is a sectional view scale taken substantially along the line 2—2 of FIG. 1 looking in the direction of the arrows;

FIG. 3, is a sectional view taken substantially along the line 3—3 of FIG. 2 looking in the direction of the arrows; and FIG. 4 is a sectional view of a prior art fastener which does not include the improved structure of the present invention.

DETAILED DESCRIPTION OF A PREFERRED EMBODIMENT

Referring to FIGS. 1 and 2, it will be noted that the cable strap 10 is wrapped around a cable 12 and is secured to a panel 14. The cable includes a tubular sheath having longitudinally spaced apart annular grooves on the outer surface thereof. The sheath is fabricated of, for example, a plastic material such as nylon. It encloses a bundle of electrical wires which form part of a wiring harness for a vehicle. The sheath is of the type commonly referred to as convolute, the annular grooves permitting bending of the sheath as necessary.

The cable strap 10 includes a flexible strap portion 16 which may be fabricated of, for example, a heat resistant nylon. A buckle 18 is provided on one end of the strap portion 16. The buckle has a slot 20 for insertion and retention of the other end 22 of the strap portion 16. As will be noted, the end 22 is permanently bent at an angle with respect to the main body of the strap. The angle may be, for example, about 25°. This permits easy insertion of the end 22 into the slot 20. The end 22 also serves as a tab for pulling. The slot 20 has a pawl 24 provided therein. Serrations 26 are provided on the underside of the strap portion 16. Upon insertion of the end 22 into the slot 20 the pawl 24 engages the serration 26 thus preventing the strap portion from being pulled out of the buckle after it has been wrapped around the cable 12 as shown in FIG. 1. This arrangement results in permanently mounting of the cable strap 10.

An improved fastener 28 is provided on the outer surface of the strap 10. The fastener 28 is illustrated as a type referred to as an "arrowhead". As will be noted, it includes a cup shaped base 30 from within which project a pair of prongs 32, 34. The base 30 includes four spaced apart upstanding side wall portions 36 which are interconnected at their lower ends on a generally rectangular frame-like support 37 to form an integrated unit. The side portions are flexible and are separated from each other so that each may independently flex when pressed against a panel.

The prongs 32, 34 extending from a narrowed-down section 38 of the strap portion 16. As best shown in FIGS. 2 and 3, the prongs 32, 34 are spaced apart and thus may be flexed toward each other. Each prong is provided with a rearwardly extending barb 40, 42. The barbs 40, 42 may also be flexed inwardly thus permitting the arrowhead to be inserted through an opening 44 in the panel 14 for securing of the strap 00 to the panel 14. The fastener 28 is located adjacent to but spaced from the buckle 18. The fastener is fabricated of the same flexible material as the strap so that the prongs and barbs may be flexed inwardly permitting the above-described insertion through the opening 44. The opening 44 is of a smaller size than the unflexed size of the prong and barb structure. After insertion of the prong and barb structure through the opening 44, there is subsequent outward flexing of the prongs 32, 34 and barbs 40, 42 to prevent removal from the panel. The outer ends 46, 48 of the barbs 40, 42 press against one surface 50 of the panel 14. The side wall portions 36 of the cup-shaped base 30 press against the opposite surface 52 of the panel. This arrangement prevents loose mounting of the cable strap 10 on the panel 14. A flexible web 54, 56 is provided between each of the barbs 40, 42 and its prong 32, 34. The webs 54, 56 also flex during insertion of the prong and barb structure through the opening 44 in the panel 14 to permit insertion of the fastener through the opening. The webs 54, 56 are each located adjacent to the juncture of their respective prongs 32, 34 and barbs 40, 42. As will be noted, the webs 54, 56 terminate a short distance therefrom leaving, as may be seen in FIG. 2, a substantial outer portion of the barbs 40, 42 unconnected to the prongs 32, 34 by the webs 54, 56, to thereby permit unrestrained flexure of the outer portion of the barbs 40, 42. As illustrated in FIG. 3, the webs are curved to cause even folding thereof upon flexing during insertion of the prong and barb structure through opening 44.

The webs 54, 56 prevent outward splaying of the barbs 40, 42 as a consequence of any force tending to pull the prong and barb structure back through the opening 44 after insertion therethrough.

FIG. 4 illustrates a prior art fastener structure 58 of the general design of the fastener 28 of the present invention which is also attached to a strap 60. The fastener structure 58 includes a cup-shaped base 62. Spaced apart prongs 64, 66 and barbs 68, 70 as previously described are provided. Note that when the fastener structure 58 is pulled in the direction of arrow 59 so as to tend to extract it back through the opening 44 in the panel 14, the barbs 68, 70 splay outwardly. The disadvantage of this construction is that, as will be noted, the cup-shaped base 62 does not press against the surface of the panel 14 thus resulting in a loose connection of the strap to the panel.

We claim:

1. In a cable strap for securing a cable to a panel, the cable strap comprising a flexible strap portion, a buckle on one end of the strap portion, the buckle having a slot for insertion and retention of the other end of the strap portion with the strap wrapped around a cable, a fastener on the outer surface of the strap portion having a section insertable through an opening in a panel for securing of the strap to the panel, the fastener being located adjacent to the buckle, the fastener including a cup-shaped base from within which projects a pair of spaced apart prongs, each prong having a rearwardly extending barb, the fastener being fabricated of a flexible material whereby the prongs and barbs may be flexed towards each other permitting insertion thereof through an opening in the panel of a smaller size than the unflexed size of the prong and barb structure with subsequent outward flexing of the prong and barb structure to prevent removal from the panel with the outer ends of the barbs pressing against one surface of the panel and the cup-shaped base pressing against the opposite surface of the panel, the improvement comprising the provision of a flexible web portion between each of the barbs and its prong, the webs also flexing during insertion of the prong and barb structure through an opening in a panel to permit such insertion, the webs preventing outward splaying of the barbs as a consequence of a force tending to pull the prong and the barb structure back through the opening in a panel after insertion to thereby maintain the integrity of the position of the fastener structure with respect to the panel surfaces, each of said webs being located adjacent to the juncture of its respective prong and barb structure and terminating a short distance therefrom leaving a substantial outer portion of the barb structure unconnected to the prong structure by the web thereby permitting unrestrained flexure of the outer portion of the barb structure.

2. The structure set forth in claim 1, further characterized in that the webs are curved to cause even folding thereof upon flexing during insertion of the prong and barb structure through an opening.

* * * * *